United States Patent [19]

Takamine et al.

[11] Patent Number: 4,811,213
[45] Date of Patent: Mar. 7, 1989

[54] VECTOR PROCESSOR WITH VECTOR REGISTERS

[75] Inventors: Yoshio Takamine; Takayuki Nakagawa, both of Kokubunji; Yoshiharu Kazama; Yoshiaki Kinoshita, both of Hadano; Shunsuke Miyamoto, Tokyo, all of Japan

[73] Assignee: Hitachi, Ltd., Tokyo, Japan

[21] Appl. No.: 918,003

[22] Filed: Oct. 14, 1986

[30] Foreign Application Priority Data

Oct. 11, 1985 [JP] Japan .................. 60-224730

[51] Int. Cl.[4] .......................................... G06F 15/347
[52] U.S. Cl. ............................................. 364/200
[58] Field of Search ............ 364/200 MS File, 730, 364/736, 900 MS File, 749

[56] References Cited

U.S. PATENT DOCUMENTS

| 4,023,023 | 5/1977 | Bourrez et al. | 364/736 |
| 4,085,447 | 4/1978 | Pertl et al. | 364/900 |
| 4,139,899 | 2/1979 | Tulpule et al. | 364/900 |
| 4,435,765 | 3/1984 | Uchida et al. | 364/200 |
| 4,490,786 | 12/1984 | Nakatani et al. | 364/736 X |
| 4,621,324 | 11/1986 | Ushiro et al. | 364/200 |
| 4,656,581 | 4/1987 | Ohwada | 364/200 |
| 4,680,730 | 7/1987 | Omoda et al. | 364/900 |

FOREIGN PATENT DOCUMENTS

| 0149556 | 9/1983 | Japan | 364/730 |
| 0263268 | 12/1985 | Japan | 364/730 |
| 0009759 | 1/1986 | Japan | 364/730 |
| 2130767 | 6/1984 | United Kingdom | 364/730 |

OTHER PUBLICATIONS

Encyclopedia of Computer Science and Engineering, Second Ed., published by Van Nostrand Reinhold Co. Inc., 1983, pp. 900-901, 917-918.

Primary Examiner—Thomas M. Heckler
Assistant Examiner—Paul Kulik
Attorney, Agent, or Firm—Antonelli, Terry & Wands

[57] ABSTRACT

In response to the execution of a single loading instruction, the front half and the rear half of a designated vector may be stored in respective vector registers in a single processor operation. For this purpose, a data distribution circuit is interposed between a group of vector registers and a vector data storage for feeding the vector data read out from the storage to a first vector processor designated by an instruction without shifting and for shifting the respective components of the read-out vector data and feeding the shifted components to a second vector register designated by the instruction.

7 Claims, 5 Drawing Sheets

VECTOR PROCESSOR WITH VECTOR REGISTERS

BACKGROUND OF THE INVENTION

The present invention relates to a digital computer (which will be called a "vector Processor") for executing arithmetic or logical operations of vectors at high speeds.

There has been devised a vector processor with vector registers for high-speed processings of large-scale matrix computations which frequently appear in scientific and technical computations (as is disclosed in U.S. Pat. No. 4,128,880). This vector processor can add respective components of vector data A and B to obtain a resultant vector C at a high speed.

The vector processor S-810 developed by the present assignee is able to execute arithmetic or logical operations of the front halves $L(1,i)$ ($i=1$ to N) (of 4-byte length) and rear halves $L(2,i)$ ($i=1$ to N) (of 4-byte length) of the respective components (of 8-byte length) of vector data A on a main storage, as shown in FIG. 1A. In this case, vector data (which will be called "vector data B") composed of the front halves $L(1,i)$ and vector data (which will be called "vector data C") composed of the rear halves $L(2,i)$ of the respective components are loaded, as shown in FIG. 1B, in vector registers VR#i and VR#j by a later-described method and have their respective components subjected to pipeline arithmetic or logical operations. Vector data (which will be called "vector data K") composed of resultant data $K(i)$ ($i=1$ to N) is stored in a vector register VR#k.

At this time, it is necessary to store the vector components $L(1,i)$ in the front 4-byte portions of the respective component storing regions of the vector register VR#i and the vector components $L(2,i)$ in the front 4-byte portions of the respective component storing regions of the vector register VR#j. In FIG. 1B, the slashed columns of the respective component storing regions of the vector registers VR#i, VR#j and VR#k designate where those region data is not directly used in the aforementioned arithmetic or logical operations.

One method of loading the vector registers with the vector data B and C, as shown in FIG. 2, is by a loading instruction to write the vector data A as it is in the vector register VR#i and a loading instruction to read out the vector data A from the main storage, to shift each component leftward by the 4-byte length by means of a shift circuit (although not shown in the drawing) and then to write (i.e., loading with shifting) the shifted component in the vector register VR#j. Even if the aforementioned two loading instructions are executed simultaneously in that case, the read-out of the vector data B and C from the main storage is delayed because the common vector data A is accessed by those instructions.

Incidentally, in FIG. 2 it is not possible to selectively read out the components $L(2,1)$, $L(2,2)$, ..., and $L(2,N)$ alone from the main storage so as to load the vector data C. This is because the main storage can access only the data of 8-byte length, which starts from address positions made discrete by the 8-byte length. For loading the vector data C, therefore, it is necessary to read out both the components $L(1,i)$ and $L(2,i)$. This requirement creates the above-specified problem.

On the other hand, a second method of loading the vector registers VR#i and VR#j with the vector data B and C, as shown in FIG. 3, is by a double loading instruction to load the vector registers VR#i and VR#l simultaneously with the vector data A and then an instruction to shift the data in the vector register VR#l leftward by 4 bytes by a shift operator (although not shown in the drawing) and to store the shifted data in the vector register VR#j. Since it is necessary in this case to execute both the double loading instruction and the shifting instruction, the processing time is elongated as a whole.

SUMMARY OF THE INVENTION

An object of the present invention is to provide a vector processor which can load different vector registers at a high speed with different portions of the respective components of vector data in a main storage.

In order to achieve this object, therefore, there is interposed between a group of vector registers and a vector data storage a data distribution circuit for not shifting but feeding the vector data read out from the storage to the first vector register designated by an instruction and for shifting the respective components of the read-out vector data and feeding the shifted components to the second vector register designated by said instruction.

As a result, as shown in FIG. 4, the upper bit portions $L(1,i)$ and lower bit portions $L(2,i)$ of the vector data A can be simultaneously loaded into different vector registers VR#i and VR#j.

DESCRIPTION OF THE PREFERRED EMBODIMENT

Figure 1A:
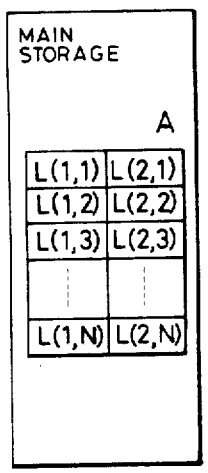
FIG. 1A is a diagram showing one example of the vector data on the main storage.
Figure 1B:
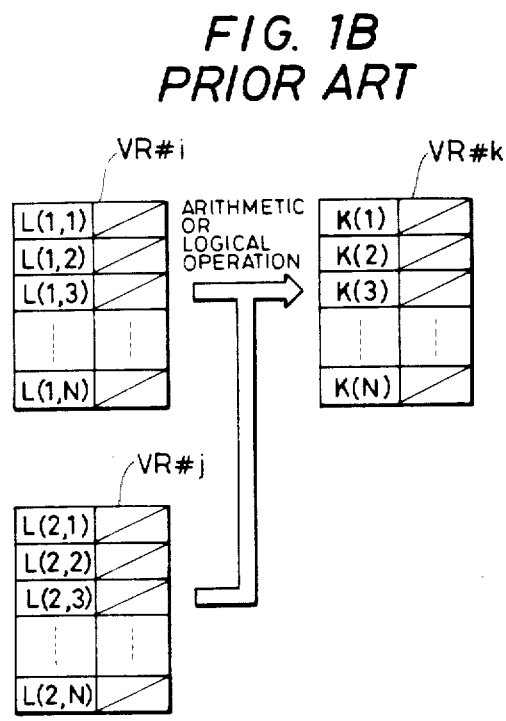
FIG. 1B is a diagram showing one example of the arithmetic or logical operations executed by a vector processor according to the prior art.
Figure 2:
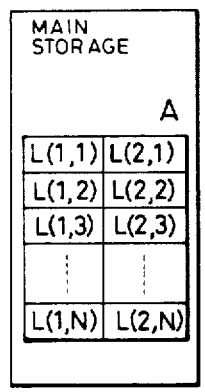
FIG. 2 is a diagram showing an example of the loading processing of the vector data for the vector processing of FIG. 1B by the vector processor according to the prior art.
Figure 2:
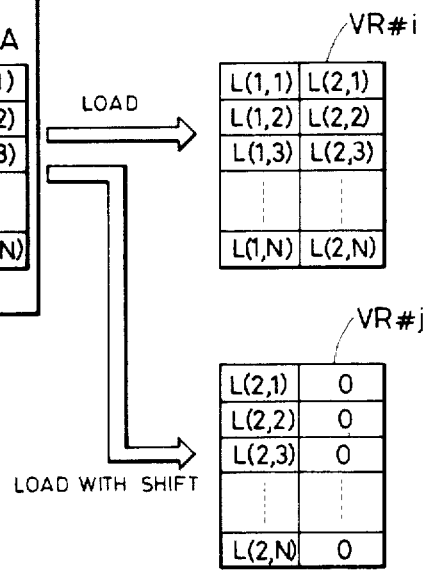
Figure 3:
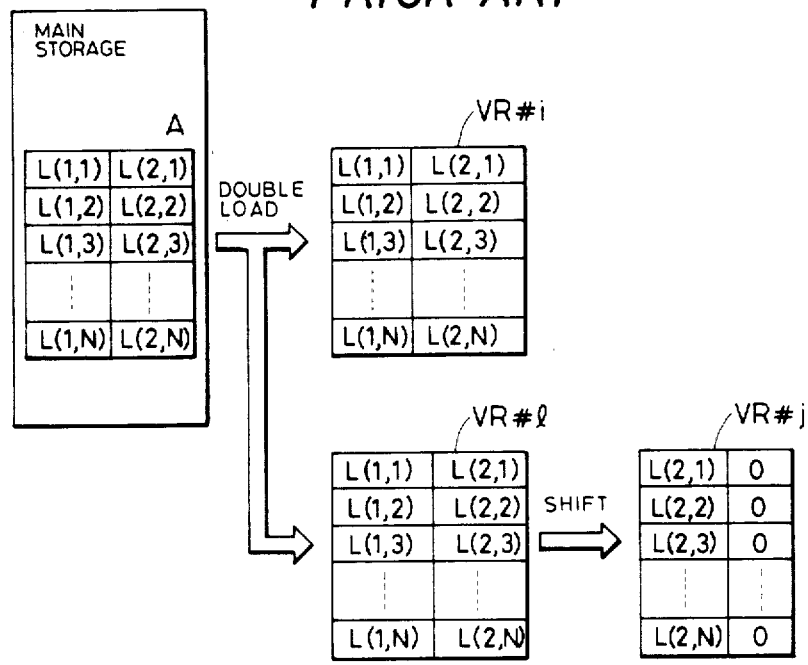
FIG. 3 is a diagram showing another example of the loading processing of the vector data for the vector processing of FIG. 1 by the vector processor according to the prior art.
Figure 4:
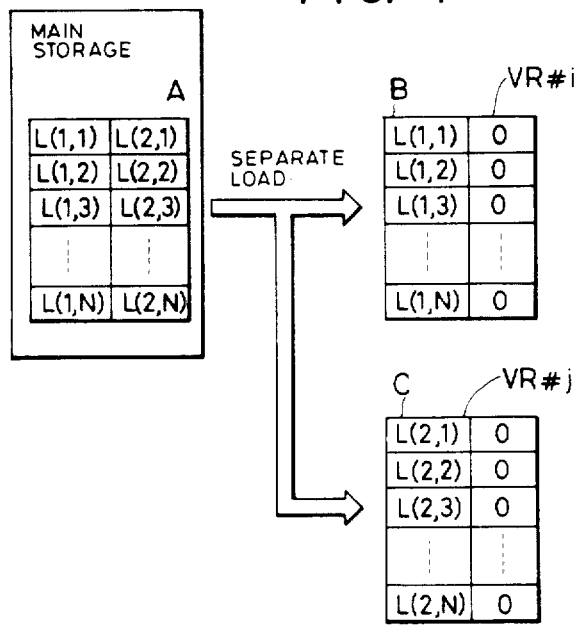
FIG. 4 is a diagram showing a loading processing according to the present invention for the vector processing of FIG. 1.
Figure 5:
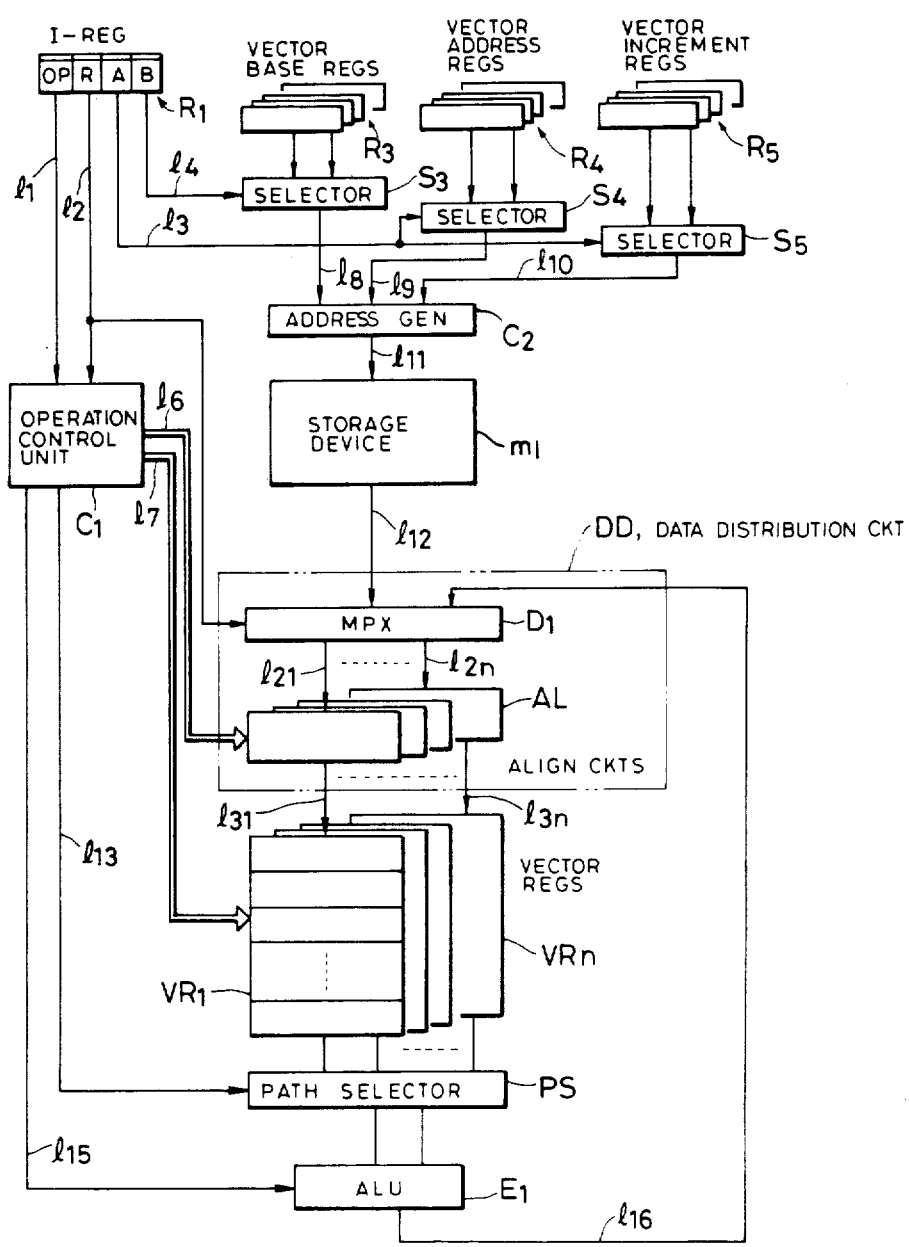
FIG. 5 is a diagram showing one embodiment of the vector processor according to the present invention.
Figure 6A:
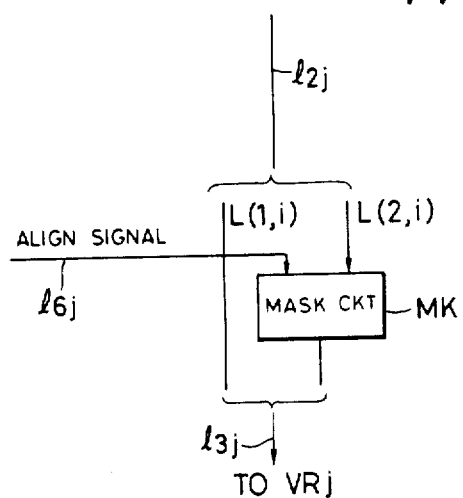
FIGS. 6A and 6B are schematic block diagrams showing align circuits in the orders of even and odd numbers of FIG. 5, respectively.
Figure 6B:
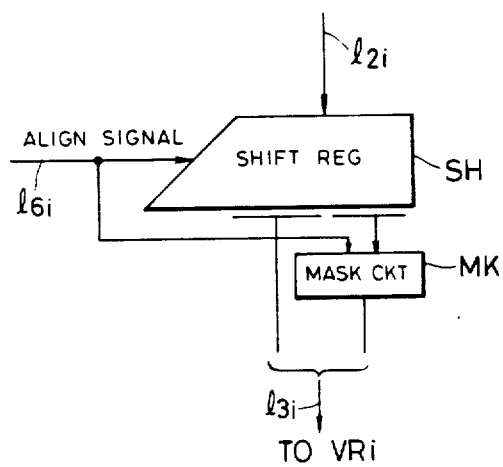

One embodiment of the present invention will be described in the following with reference to FIG. 5. In FIG. 5, a register R1 is an instruction register. The present embodiment uses an instruction for the processing shown in FIG. 4 as one of the instructions (i.e., loading instructions) to read out vector data from a storage device $M_1$ and store it in vector registers. The instruction used will be called a "separate loading instruction". This loading instruction is divided into four fields. Of these, the OP field indicates an instruction code, the content of which is sent via a line l1 to an operation control unit C1. An R field indicates the number of vector registers for storing vector data read out from the storage device M1, and its content is sent via a line l2 to the operation control unit C1 and a distributor D1 in a data distribution circuit DD. An A field indicates the number of one register of a group of vector address registers R4 and a group of vector increment registers R5, and its content is sent via a line l3 to selectors S4 and S5. The B field indicates the number of one register of a group of vector base registers R3, and its content is sent via a line l4 to a selector S3. The vector base register group R3 holds the vector base addresses in the storage device M1. A group of vector address registers R4 holds the vector addresses in the storage device M1 like the vector base register group R3. The vector increment register group R5 holds the address intervals of the vector components in the storage device M1. The selectors S3, S4 and S5 are provided for reading out the respective ones of the grouped vector base registors R3, vector address registers R4 and vector increment registers R5 in accordance with register numbers B, A and A sent via the lines l4, l3 and l3, respectively, and for sending the read data from the selected registers to lines l8, l9 and l10, respectively. An address generator C2 is provided for multiplying the content of one vector increment register sent via the line l5 by the vector component number, for adding the content of one vector address register sent via the line l4 and the content of one vector base register sent via the line l3 to the multiplied content and for sending the added content as the address of the vector component in the storage device M1 to a line l11. This storage device M1 is a vector data storing device for reading out the vector component present at the storage location identified by the address sent via the line l11 in accordance with a timing signal sent via a line l5 and for sending the read vector component to a line l12. The data distribution circuit DD is provided for selectively feeding the vector data read out from the storage device M1 to a group of vector registers VR1 to VRn. The distributor D1 is provided for selectively outputting the read vector data to signal lines l21 to l2n provided to correspond to the respective vector registers. Reference characters AL1 to ALn denote a group of align circuits for shifting or masking the data on the lines l21 to l2n. The distributor D1 sends the vector data coming via the line l2 to both the align circuits which are provided for vector registers bearing numbers R and the align circuits which are provided for vector registers bearing numbers R+1. The align circuit for the vector registers bearing even numbers has, as shown in FIG. 6A, a mask circuit MK for transferring the upper halves L(1,1) to L(1,N) of the vector elements sent from the distributor D1 and for setting all the lower halves L(2,1) to L(2,N) at 0 when an align signal l6j is at 1. The align circuit for the vector registers bearing odd numbers has, as shown in FIG. 6B, both a shift circuit SH for the respective vector components leftward by 4 bytes, so that the lower halves of the vector components sent from the distributor D1 when the align signal l6i is at 1 may come to the positions of the upper halves, and a mask circuit MK for setting all the data of the positions of the lower halves at 0 when the align signal l6i is at 1. Reference letters PS denote a path selector for sending to an arithmetic or logical unit E1 the vector data read out from the vector register designated by an instruction to execute the arithmetic or logical operations for the vector data in the grouped vector registers VR1 to VRn when the instruction is set in the instruction register R1. The vector data resulting from the arithmetic or logical operations are stored through the data distribution circuit DD in the grouped registers VR1 to VRn. The operation control unit C1 is one for controlling the distributor D1, the grouped align circuits AL1 to ALn, the grouped vector registers VR1 to VRn, the storage device M1, the path selector PS and the arithmetic or logical unit E1.

Next, the operations of the present embodiment will be described in detail in the following. When the load separate instruction is inputted to the instruction register R1, the contents of the respective fields OP, R, A and B are sent via the lines l1, l2, l3 and l4, respectively, to the operation control unit C1, the distributor D1, and the selectors S4 and S3. The A field is fed via the line l4 to the selector S5, too. The selector S3 reads out the vector base address from the base register bearing the register number of the B field and sends it to the line l8. On the other hand, the selectors S4 and S5 read out the vector addresses and the address intervals from the vector address register and vector increment register bearing the register numbers of the A field and sends them to the lines l9 and l10. And, the address generator C2 computes the vector component address in the storage device M1 from the addresses and address intervals sent via the lines l8, l9 and l10 and sends it to the line l11. At the same time, the distributor D1 sends the vector data on the line l12 to both the align circuit corresponding to the register number R designated by the instruction and the align circuit corresponding to the vector register bearing the number R+1. Then, the operation control unit C1 responds to the operation code OP sends the read instruction via the line l5 to the storage device M1 so that the vector data read out is sent to the line l12. The operations thus far described are similar to those of the known vector processor when the loading instruction is executed, and their further detailed descriptions are omitted.

Figure 7:
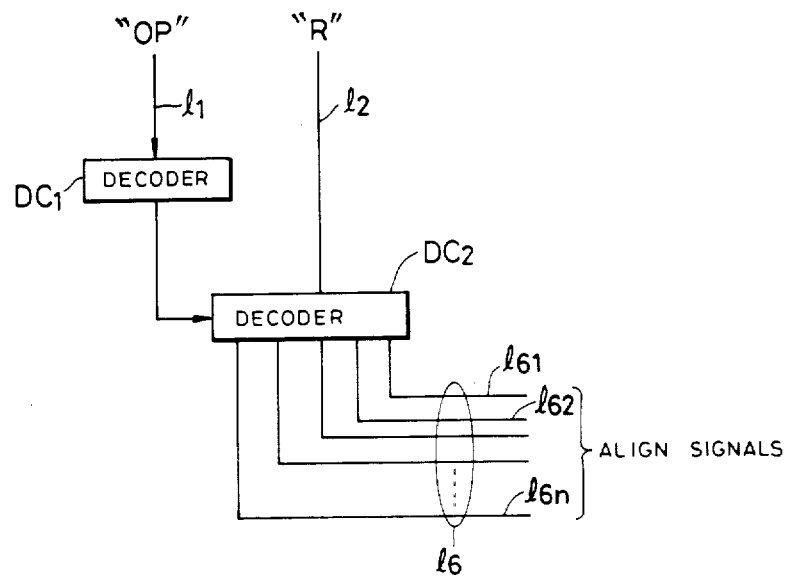
FIG. 7 is a block diagram showing such a portion of the inside of an operation control unit $C_1$ of FIG. 5 related to the present invention.

The portion of the operation control unit C1 characterizing the present invention is shown in FIG. 7. A decoder DC1 starts a decoder DC2 when the operation code OP corresponds to what is called a separate loading instruction in the present invention. The decoder DC2 selectively sends the align signal to the align circuits AL1 to ALn via lines l61 to l6n and accordingly to the align circuits corresponding to the vector registers bearing the register number R designated by the instruction and the register number R+1. As a result, when the vector register number R is even, the align circuit corresponding to that number R has the construction of FIG. 6A. Therefore, all the lower halves of the respective components of the vector data inputted via the line l2j are set at 0 and are sent to the corresponding vector registers. At the same time, since the align circuit corresponding to the vector register bearing the number R+1 has the construction of FIG. 6B, the lower halves of the vector components sent from the distributor D1 are shifted to the positions of the upper halves, and the value 0 is set at the positions of the lower halves and sent to the corresponding vector registers. As a result, as shown in FIG. 4, the vector data B and C composed of the upper and lower halves, respectively, are simultaneously stored in different vector registers on the basis of the respective vector components of the vector data A read out from the storage device M1. Similar operations are conducted, too, when the vector register number R is odd.

Thus, the processings of the separate loading instructions according to the present invention are completed.

Incidentally, as shown in FIG. 5, the arithmetic or logical operations of the vector data in the vector registers are conducted in a similar way to the prior art. Specifically, the instruction register R1 is set with the instructions for designating the numbers of a pair of vector registers to be read out as arithmetic or logical operands, the numbers of the vector register for storing the arithmetic resultant data, and the OP codes indicating the kinds of the operations. In response to those instructions, the operation control unit C1 controls the reading of the vector data from the grouped vector registers R2, the connection between the output lines of the grouped vector registers and the arithmetic or logical unit E1 by the path selector PS, the arithmetic or logical unit E1, and the distributor D1. At this time, the grouped align circuits add no change to the data inputted.

Incidentally, in case the instruction requiring the arithmetic or logical operations for the vector data B and C shown in FIG. 4 is executed, the arithmetic or logical unit Ei is so controlled by the operation control unit C1 that only the front 4-byte halves of the operands inputted are subjected to the arithmetic or logical operations.

In addition to the present embodiment described above, the present invention can be modified in various ways. For example, all the mask circuits MK in the aforementioned align circuits AL1 to ALn can be omitted.

Figure 8:
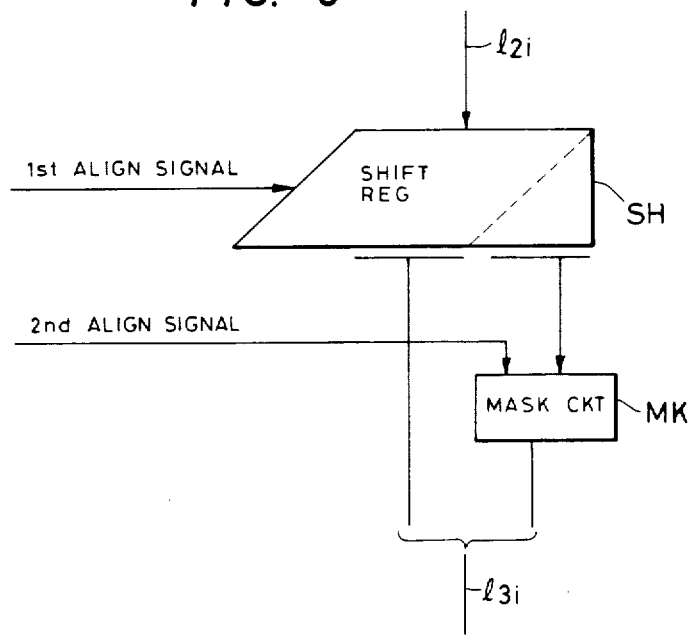
FIG. 8 is a modification example of the align circuit to be used in the system of FIG. 5.

Moreover, the align circuits AL1 to ALn need not have the two constructions of FIGS. 6A and 6B but can have an identical construction. This is exemplified in FIG. 8B, which is constructed of the shift register SH for controlling whether or not the leftward shifting operation is to be conducted in response to a first align signal and the mask circuit MK for controlling whether or not the lower halves of the output of the shift register SH are to be masked. In this modification, the operation control unit C1 needs to be so corrected that, when the separate loading instruction is to be executed, the align circuit for the vector register bearing the register number R has its first and second align signals set at 1 whereas the align circuit for the vector register bearing the register number R+1 has its first align signal set at 0 and its second align signal set at 1. Furthermore, the grouped align circuits AL1 to ALn can be controlled to operate similarly to the aforementioned separate loading processing when the resultant vector data from the arithmetic or logical unit E1 is to be stored in the grouped vector registers.

In order to determine the vector component addresses in the storage device M1, the present embodiment uses the grouped vector base registers R3, the grouped vector address registers R4 and the grouped vector increment registers R5, but the present invention may be exemplified by list vectors using the grouped vector base registers R3 and the grouped vector registers R2. Moreover, a plurality of vector registers for storing data vectors having been shifted can be individually designated by using a plurality of R-fields. Still moreover, the positions for separating each vector component into a plurality of sections may be either fixed depending upon the kinds of instructions or made changeable by other control registers.

As has been apparent from the description thus far made, according to the present invention, the vector data having a plurality of sections of different characteristics shown in FIG. 4 an be stored in the plural vector registers in accordance with a single instruction so that the loading processing can be executed at a high speed.

What is claimed is:

1. A vector processor comprising:
    main storage means for storing vector data in the form of vector elements of predetermined bit length in respective storage locations, said vector elements each including first and second parts representing first and second vector data, respectively;
    a plurality of vector registers for respectively holding plural vector data of said predetermined bit length;
    arithmetic means connected to said vector registers for performing an operation on vector data of said predetermined bit length read out from said vector registers and for supplying resultant vector data of predetermined bit length to said vector registers;
    access means for sequentially generating main storage addresses of respective storage locations in said main storage means which contain vector elements in response to a loading instruction and for accessing said main storage means on the basis of the generated addresses to sequentially read out respective vector elements; and
    data distributing means connected to said main storage means and said plurality of vector registers for simultaneously supplying the respective first and second parts of said vector elements read out by said access means respectively to first and second vector registers designated by said loading instruction, said data distributing means including shift means for shifting one of the first and second parts of said respective vector elements read out before supply thereof to one of the designated plural first and second vector registers, so that said first and second parts of each vector element are stored at corresponding positions within the vector data of predetermined length held in said first and second vector registers.

2. A vector processor according to claim 1, wherein said data distributing means includes:
    distribution means for transferring the respective first and second parts of said read out vector elements simultaneously to respective ones of plural output signal lines, each output signal line being provided in correspondence to a respective one of said plurality of vector registers; and
    a plurality of shift means respectively connected to respective ones of said plurality of output signal lines for selectively shifting the data transferred by said distribution means and for transferring the shifted data to one of said designated vector registers.

3. A vector processor according to claim 2, wherein the number of shift means in said distribution means is less than the number of output signal lines so that plural output signal lines are not connected to a shift means, and wherein said data distributing means further includes:
    a plurality of first mask means connected to respective outputs of said plurality of shift means, respectively; and a plurality of second mask means connected to respective output signal lines other than the plural output signal lines to which a shift means is connected, respectively.

4. A vector processor according to claim 1, wherein said data distributing means includes:
   a plurality of shift means each provided in correspondence to one of said plurality of vector registers;
   distribution means for selectively supplying vector data read out by said access means to such plural ones of said plurality of shift means as are provided for plural ones of the plurality of vector registers designated by said loading instruction; and
   control means connected to said plurality of shift means for controlling the respective shift amounts by said plural shift means in response to said loading instruction.

5. A vector processor according to claim 4, wherein said data distributing means further includes a plurality of mask means each connected to an output of a respective one of said plurality of shift means for masking an output of the corresponding shift means, and wherein said control means includes means connected to said plurality of mask means for controlling the masking performed by the mask means connected to outputs of said plural shift means in response to said loading instruction.

6. A vector processor according to claim 1, wherein said data distribution means further includes means for masking said first part of each vector element of the vector data provided by the shift means before supply of the vector data to one of the designated first and second vector registers and for masking said second part of each vector element of the vector data to be provided to the other one of the designated first and second vector registers.

7. A vector processor according to claim 1, wherein said data distributing means includes:
   means for masking the second part of each vector element read out of said main storage means and for supplying to said first vector register the unmasked first part of each vector element followed by a number of bits of value zero equal to the number of bits of said masked second part;
   said shift means including means for shifting each vector element by a number of bits equal to the number of bits in the first part thereof and by supplying to said second vector register the second part of each vector element followed by a number of bits of value zero equal to the number of bits of said first part thereof.

* * * * *